June 4, 1946.   R. L. TOWNSEND   2,401,523
WELDING ELECTRODE HOLDER
Filed Sept. 19, 1944   2 Sheets-Sheet 2

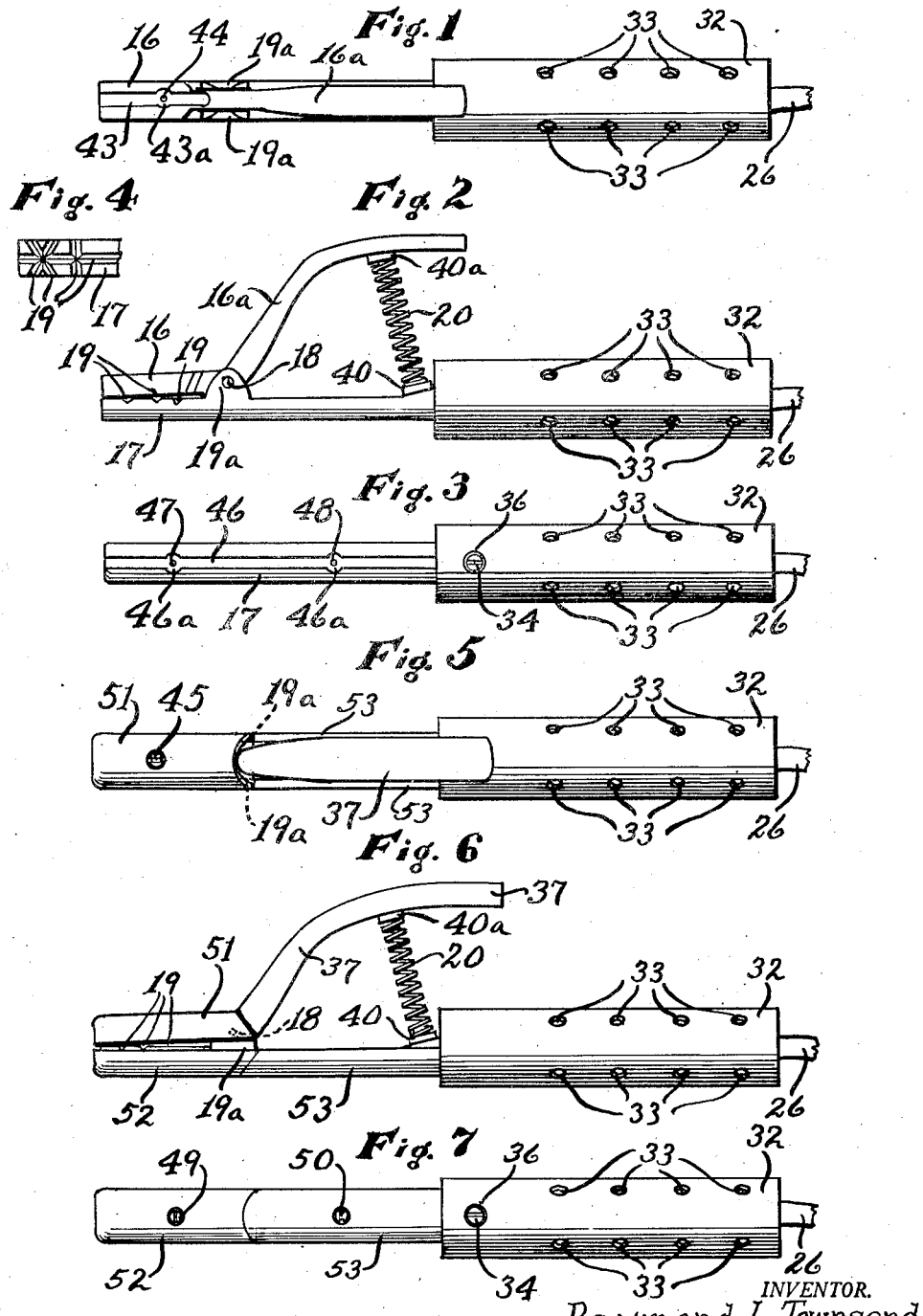

INVENTOR
*Raymond L. Townsend*
BY
*M. Y. Charles*
ATTORNEY

Patented June 4, 1946

2,401,523

UNITED STATES PATENT OFFICE 2,401,523

WELDING ELECTRODE HOLDER

Raymond L. Townsend, Wichita, Kans.

Application September 19, 1944, Serial No. 554,746

4 Claims. (Cl. 219—8)

My invention relates to an improvement in welding electrode holders. In holders of this kind a low voltage and high amperage electric current is used, therefore the current is not dangerous to one coming in contact with it, but in using the device more or less heat is developed, therefore it is important that good electrical connections are made and maintained in the holder.

Most electrode holders are not very well insulated and if the holder should be laid down and should contact the work being worked on, a short circuit would occur and cause damage to the electrode holder as well as the work. In order to avoid such happenings as this, it is obvious that if the holder were better insulated, such short circuits would not occur.

In view of the foregoing explanation, it is the object of my invention to provide a welding electrode holder in which provision is made for substantially a perfect electrical connection between the cable feeding electric current to the holder and the holder itself.

A further object is to provide an electrical connection as above mentioned, and in addition thereto to provide a mechanical clamp for holding the feed cable so that undue strains on the cable will not tend to loosen or impair the above mentioned electrical connection.

A still further object is to provide a welding electrode holder of the kind mentioned that is provided with a handle made of electrical insulation material, preferably of fiber tubing, and also to provide a positive and protected means for binding or attaching the handle to the electrode holder device.

A still further object is to provide a device of the kind mentioned and to also provide an attachable and detachable insulation for the normally exposed clamp and clamp handle portions of the welding electrode holder device.

A still further object is to provide insulation elements as last above mentioned that when placed on the electrode holder are rigidly fixed thereon and will not slide longitudinally on, or slip around the jaws of the electrode holder.

A still further object is to provide an efficient and a simple means of insulating the jaw handle spring of the holder. These and other objects will be more fully explained as this description progresses.

Now referring to the accompanying drawings;

Fig. 1 is a top plan view of the welding electrode holder, the jaw insulation being removed therefrom for convenience of illustration.

Fig. 2 is a side view of the welding electrode holder as shown in Fig. 1.

Fig. 3 is a bottom plan view of the welding electrode holder as shown in Figures 1 and 2.

Fig. 4 is a detail plan view of one of the welding electrode contacting jaw faces.

Fig. 5 is a top plan view of the welding electrode holder to which my improved insulation elements are applied.

Fig. 6 is a side view of the welding electrode holder as shown in Fig. 5.

Fig. 7 is a bottom plan view of the welding electrode holder shown in Figures 5 and 6.

Fig. 8 is a front view of the welding electrode holder as shown in Fig. 2.

Fig. 9 is a front view of the welding electrode holder as shown in Fig. 6.

Fig. 10 is an enlarged detail longitudinal sectional view of the welding electrode holder.

Fig. 11 is a detail sectional view through the handle portion of the welding electrode holder, the view being taken along the line XI—XI in Fig. 10 and looking in the direction of the arrows.

Fig. 12 is a reduced detail bottom plan view of the upper jaw insulation element.

Fig. 13 is a reduced top plan view of the insulation element for the outer end portion of the lower electrode holder jaw.

Fig. 14 is a reduced detail top plan view of the insulation element for the rear portion of the lower welding electrode jaw of the holder.

Fig. 15 is a cross sectional detail view of the insulation elements shown in Figures 12, 13 and 14, the view being taken along the line XV—XV in Fig. 13, and looking in the direction of the arrows.

Fig. 16 is a cross sectional detail view through the insulation elements shown in Figures 12, 13 and 14, the view being taken along the line XVI—XVI in Fig. 13 and looking in the direction of the arrows.

Similar numerals of reference designate the same parts throughout the several figures of the drawings.

In the drawings, my improved welding electrode holder is shown as having jaw elements 16 and 17 that are hingedly secured together as shown at 18, and one of the opposing faces of said jaw member 17 is provided with a plurality of grooves 19 that are preferably V-shaped and oppositely disposed so as to clamp an electrode therein in varying positions relative to the jaw members 16 and 17, one of the grooves longitudinally of the jaw 17 while the other grooves are arranged transversely of the jaw 17, for the holding of the electrode in direction in alignment with the respective groove being used.

The hinging means for connecting the jaw members 16 and 17 include ears 19 that are spaced apart and are in parallelism with each other, and are integrally formed on the jaw member 17.

The rear portion 16a of the jaw member 16 continues as a clamp handle, and interposed between the clamp handle 16a and the rear portion of the jaw member 17 is a helical compression spring 20 that serves to press the outer ends of the jaws 16 and 17 together in a clamping effect.

The rear portion of the jaw member 17 merges into a cup formation 21 which has an extension portion 21a through which passes a bolt 22. At 23 is shown a toothed clamp element that is positioned over the cup extension 21a and through which the bolt 22 also passes. At 24 is shown a washer against which a nut 25 that is threaded on the bolt 22 bears.

At 26 is shown an electrical feed wire that is positioned between the clamp elements 21a—23, and the end of which is positioned in the cup 21 and is rigidly held therein by babbitt or solder 27 to insure a perfect electrical connection. The nut 25 being threaded on the bolt 22 and serving to press the clamp element 23 against the wire 26 to rigidly bind and hold the wire 26 between the clamp elements 21a—23.

The body portion 28 preceding the cup 21, and the outer edge of the cup 21 are provided with outwardly extending annular flange portions 29 and 30 that are integrally formed thereon, also the edge of the cup extension 21a is provided with a similar flange 31. These flanges 29 and 30 form a support for a tubular handle 32 that is made of insulation material, and is provided with ventilation holes 33. In the metal intermediate the cup 21 and the flange 29, and threaded therethrough is a screw 34, there being a countersunk portion 35 to receive the head of the screw 34. In the tubular handle 32, and in axial alignment with the screw 34 is a hole 36 through which a screw driver may be passed to engage and turn the screw 34 so that the other end thereof will engage and bind against the inner surface of the tubular handle 32 as a means of retaining the handle on the electrode holder device. The wire 26 enters through the rear end of the handle 32 and is connected to the device as above described.

The clamp handle 16a is provided with an insulation covering 37 that is easily made by slipping a piece of rubber tubing, or other insulating material on the handle 16a. The rear portion of the jaw member 17 is provided with a pin formation 38 that is integrally formed thereon and serves as a stationing element for an insulation sleeve 39 that is provided with an outwardly extending annular flange portion 40 on which one end of the spring 20 rests, the sleeve 39 and flange 40 serving to insulate its respective end of the spring 20 from the pin 38 and the member 17 of which it is a part. At the other end of the spring 20 is a similar flanged sleeve 39a—40a in in which is tightly fitted a pin or screw 41 that is slidably removable from a hole 42 through the insulation 37 and in the clamp handle element 16a. The flanged sleeve 39a—40a serves to insulate the other end of the spring 20 from the handle 16a, so that the spring 20 is insulated from all other metallic parts of the welding electrode holder. The sleeves 39 and 39a are a press fit in the turns of the spring 20 so that the assembly of these parts comprise a single unit which makes for the easy assembly thereof.

The top portion of the jaw 16 is semi-circular in shape and is provided with a longitudinally disposed groove 43 therein and having an enlarged circular portion 43a in the center of which is a threaded hole 44 to receive a screw 45 for purposes that will later be explained.

The bottom portion of the lower jaw member 17 is also semi-circular in shape and is also provided with a longitudinally disposed groove 46 that extends from the outer end of the jaw 17 to a point extending approximately to the flange element 29 within the handle element 32 and is provided with a plurality of enlarged circular portions 46a in the center of each of which is a threaded hole as at 47 and 48 to receive screws 49 and 50 for purposes that will later be explained.

The jaws 16 and 17 and the rear portion of the jaw member 17 are insulated with insulation elements 51, 52, and 53.

The insulation elements 51 and 52 are identical, and consists of substantially a semi-circular cross section piece having one end closed as at 51a and 52a, while both ends of the insulation element 53 are open. Each insulation element 51, 52 and 53 is provided with a longitudinally disposed rib or tongue 54 which is integrally formed on the inner side of each insulation element 51, 52 and 53, the tongue being so fashioned to snugly fit in the grooves 43 and 46 of the jaw members 16 and 17. In the inner central portion of each insulation element 51, 52 and 53 is an enlarged boss formation 55 that is of such proportion that the boss 55 will snugly fit in the enlarged circular portion 43a and 46a. Each boss 55 is provided with a screw hole 56 the outer ends of which are countersunk to receive the head of its respective screw 45, 49 and 50. The screws 45, 49 and 50 pass through these respective insulation elements 51, 52 or 53 and are threaded into their respective holes 44, 47 or 48 to rigidly bind and hold the insulation element 51 on the jaw member 16 and to similarly hold the insulation elements 52 and 53 on the jaw member 17 in such a manner that the ends of the jaw elements 16 and 17 are covered except for the depth of the welding rod reception grooves 19. This space between the ends 51a and 52a also continues down each side between the insulation elements 51 and 52. The insulation element 51 meets the handle insulation elements 37, and 52 and 53 abut each other while the other end of the insulation element 53 meets or abuts the adjacent end of the tubular insulation handle 32.

The foregoing described device provides a fully insulated welding electrode holder, the jaw insulation elements of which are not bulky or cumbersome, and are so attached to their respective elements of the welding rod holder that they are solid and will not slip either longitudinally on or around the jaws 16 and 17 and the screws 45, 49 and 50 merely hold the insulation elements 51, 52 and 53 on the holder and they do not receive any strain from the insulation elements 51, 52 and 53 wanting to slide on or around their respective jaw members 16 or 17; the tongues 54 and bosses 55 take these strains.

To use this device the jaw handle 16a may be pressed downward toward the lower jaw portion 17 whereupon the clamping jaw elements 16 and 17 are separated. This having been done, an electrode or welding rod may be placed in any desired groove 19 whereupon the clamp handle 16a may be released and the spring 20 will act to press the jaws 16 and 17 together to rigidly bind and hold the electrode whereupon the act of electric welding may be executed in the usual well known manner.

Such modifications of my invention may be employed as lie within the scope of the appended claims without departing from the spirit and intention of my invention. Now having fully shown and described my invention, what I claim is:

1. In an electric welding electrode holder device of the kind described; the combination of a pair of combination jaw and handle elements, said elements being pivotally joined together at the dividing point between the handle and jaw portion of each element, compression spring means interposed between the handle portion of the said elements for resiliently holding the jaws in a closed position, and means electrically insulating the spring means from the balance of the holder, and means for mechanically and electrically connecting an electric feed cable to one of said handle elements, a tubular hand hold element of insulation material, said hand hold element being slidably mounted on one of said handle elements and housing the said means for mechanically and electrically connecting the electric feed cable to the handle, and screw means threaded through the handle element and being engageable with the inner surface of the hand hold element to rigidly retain the hand hold element on its respective handle element, said hand hold element having an opening therein registering with said screw means for passage of a tool for turning said screw means, and insulation material covering the other of said handle elements up to the pivotal connection point of the two first said elements, the cross section of each of said jaws being substantially a half circle, each jaw member and one handle member having a longitudinally disposed groove therein and extending the length thereof and having boss receiving enlargements at intervals therealong, said grooves being positioned at ninety degrees to the diameter of the said half circles, the base of said enlargements having threaded screw receiving means therein, electrical insulation members, the inner surface of said electrical insulation members being curved and having tongue and boss formations thereon that are receivable in said grooves and groove enlargements so that the insulation members may be lifted directly from and replaced on the handle and jaw elements and the tongue and boss portions will serve to prevent rotary and longitudinal movements of the insulation members on their respective parts of the welding electrode holder, and screw means passing through said boss portions and being threaded into the material supporting the insulating members for the rigid attachment of the insulation members to their respective supporting members of the welding electrode holder, the insulation members housing the jaws of the welding electrode holder having one end closed to house the end faces of the said jaws.

2. In an electric welding electrode holder of the kind described; said electrode holder having electrode holder jaws, handle means for holding said electrode holder device, and spring means for resiliently holding said jaws in a closed position, the cross section of each jaw member being substantially a half circle with the flat surface of each jaw opposing that of the other, and means in one of said flat faces for seating a welding electrode therein, insulation members, said insulation members having round surfaces for fitting against the round surface of the said jaw members, and tongue and groove means carried by the said jaws and insulation members to prevent rotary movements of the insulation members on the jaw members, bosses and boss seats in said jaws, and bosses carried by the insulation members and seated in said boss seats in the jaw members for preventing longitudinal movements of the insulation members on the said jaw members, and screw means for holding the insulation members on the jaw members.

3. In an insulation member for electric welding electrode holders, said insulation member being a hollow half circle, and rib means projecting from the concave side of the hollow half circle as a key to be received by the electrode holder, and means for rigidly attaching the insulation member to the electrode holder.

4. In an electric welding electrode holder device; said device having electrode holder jaws and handle members, said jaw and handle members being pivotally joined together at the dividing point between the jaw and handle portions of the jaw and handle members, and spring means for moving said jaws toward each other, the backs of said jaws being a half circle in shape and having a longitudinal groove with boss receiving enlargements in the back thereof, insulation members for said jaws and handles, said insulation members being lengths of hollow half circle shaped elements having a tongue and boss portions projecting from the concave side of the half circle in position to be received in the groove and boss seats in the said jaws, and screw means passing through said insulation members and threaded into the jaw and handle members to hold the insulation members on the jaw and handle members, and means connected to one of the handle members for delivering an electric current to the electrode holder device.

RAYMOND L. TOWNSEND.